Patented Dec. 15, 1925.

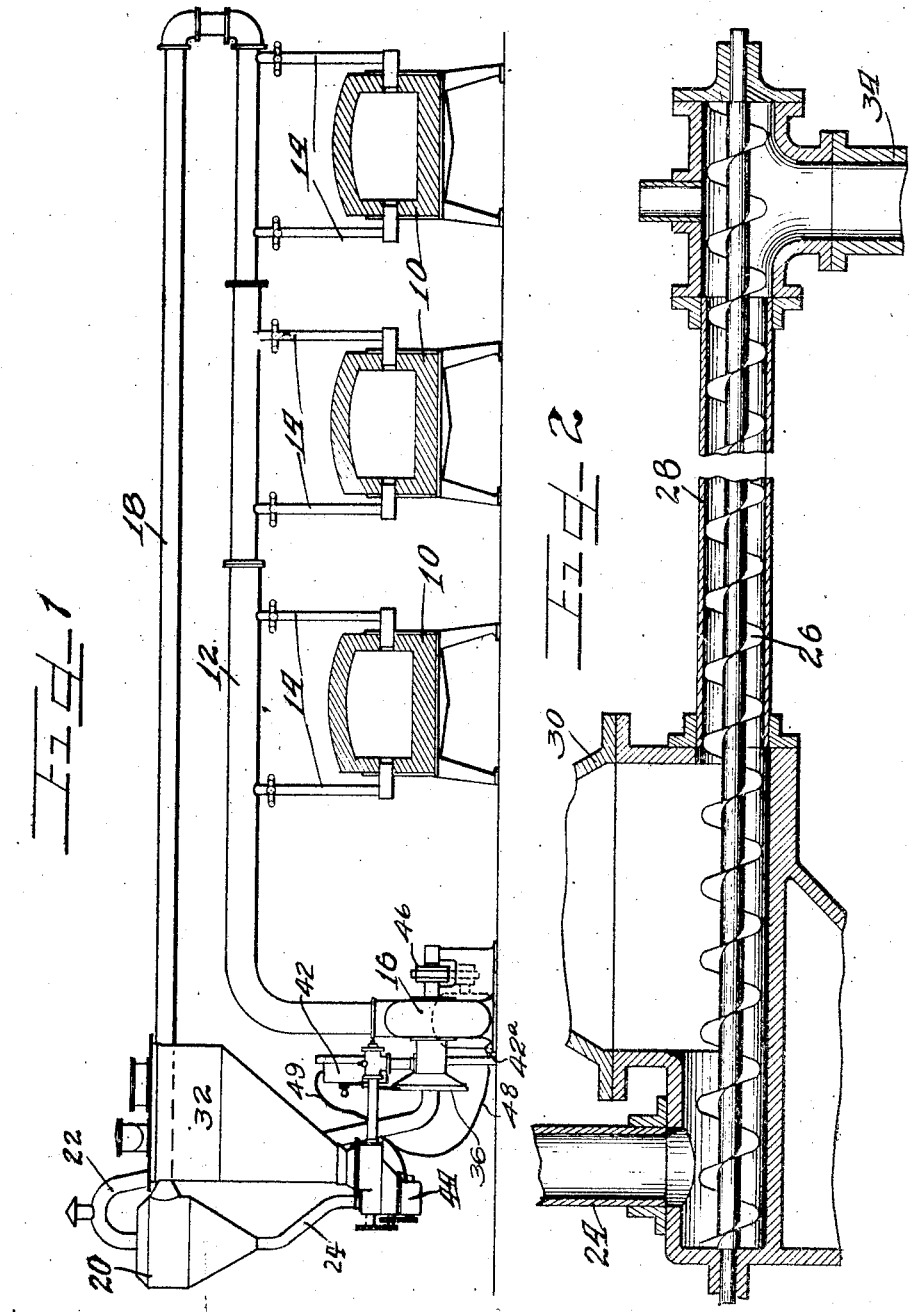

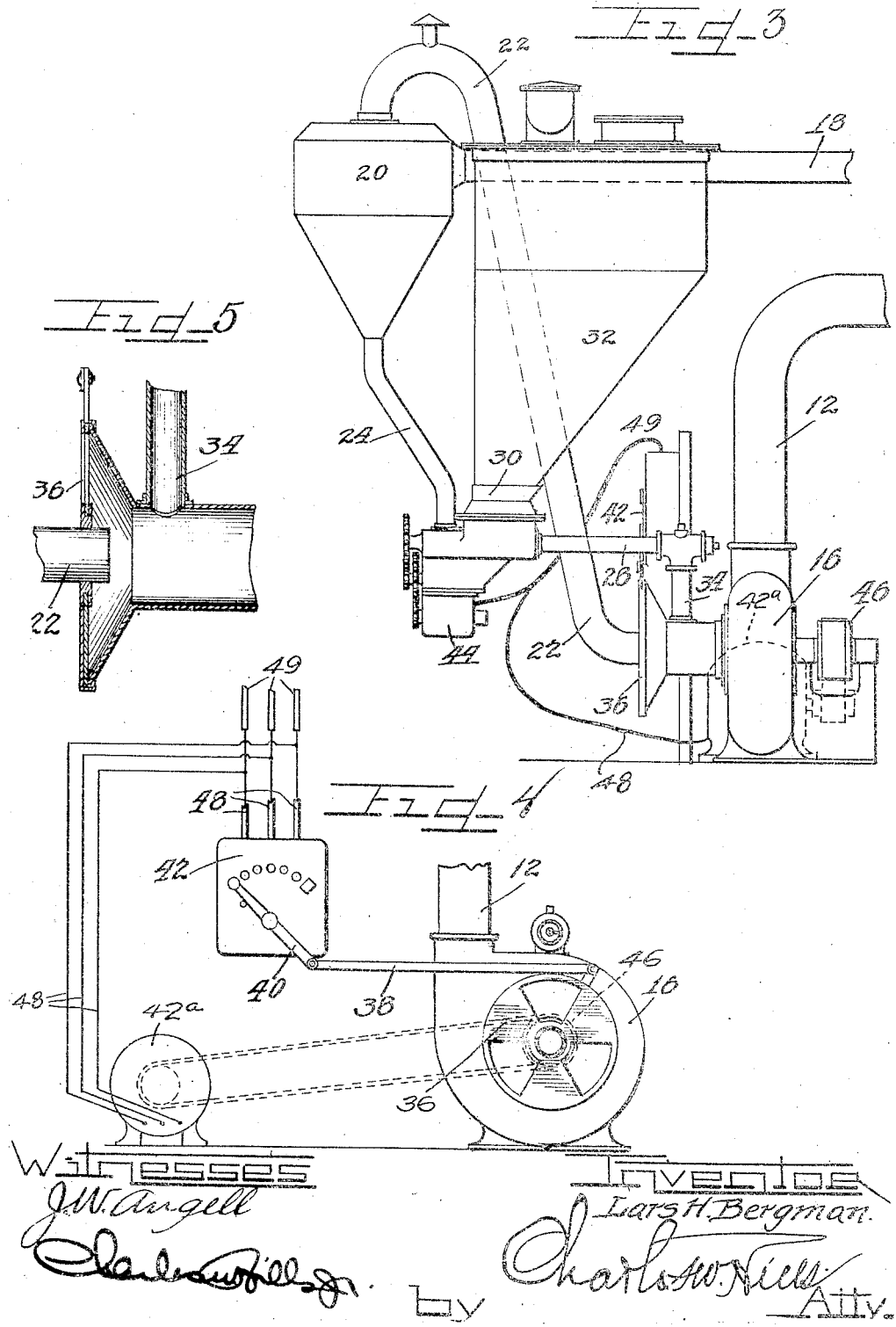

1,565,893

UNITED STATES PATENT OFFICE.

LARS H. BERGMAN, OF CHICAGO, ILLINOIS, ASSIGNOR, BY MESNE ASSIGNMENTS, TO RAYMOND BROS. ENGINEERING CO., OF CHICAGO, ILLINOIS, A CORPORATION OF ILLINOIS.

PULVERIZED-FUEL-FEED SYSTEM.

Application filed December 27, 1920. Serial No. 433,326.

*To all whom it may concern:*

Be it known that I, LARS H. BERGMAN, a citizen of the United States, and a resident of the city of Chicago, in the county of Cook and State of Illinois, have invented certain new and useful Improvements in a Pulverized-Fuel-Feed System; and I do hereby declare that the following is a full, clear, and exact description of the same, reference being had to the accompanying drawings, and to the numerals of reference marked thereon, which form a part of this specification.

In the present day application of pulverized coal as a fuel for furnaces, including brick kilns, metallurgical furnaces, cement kilns and the like, it has been found most efficient and convenient to operate a series of furnaces from a single, centrally controlled, fuel feeding device and this system of feeding the pulverized fuel has been so perfected that it is now possible to distribute the pulverized fuel to widely scattered furnaces, ordinarily by pumping a properly apportioned mixture of air and fuel through a distributing pipe line. Usually the coal pulverizing plant must necessarily be located some distance from the furnaces, and therefore it is necessary that the distributing system be efficient and adapted to be continuously operated, and moreover it must be of such a capacity that the correct maximum amount of fuel may be fed to each furnace and to any or all of the furnaces no matter how many of them are working at a given time.

In the fuel feed system for a number of furnaces illustrated in this invention the pulverized fuel is mixed with air in the proper proportions for conveyance and is then propelled by a fan pump or blower through a system of pipes or conveyors from which leads are taken off leading to the respective furnaces. Any portion of this air and coal dust mixture not used in the furnaces is returned through a system of pipes to the central station from which it is again distributed to the pipe line by means of the fan blower.

Heretofore the returned coal dust and the air with which it is mixed have been usually discharged into a cyclone separator, wherein the coal is collected and the air permitted to escape into the outside atmosphere. The extracted coal dust was returned to the storage bin for remixing in the millhouse fan.

In some other systems the return line for the excess fuel is led directly back to the fan from whence the fuel is immediately again pumped into the main distributing pipe together with the air with which it was originally mixed. The amount of coal and air mixture returned to the pipe line varied, of course, with the number of furnaces operating at different times and any deficiency in the quality of the mixture or of the quantity of fuel fed was made up from an automatically controlled mixing chamber at the top of the main fuel bin, from whence the mixture was fed by another pipe into the blower.

However, all of these systems have disadvantages, the first system being rather dangerous at times on account of the fact that the coal and air, by passing through the distributing main in proximity to the furnaces, become heated and the coal, in its finely pulverized condition, especially when mixed with the heated air, is liable to spontaneous combustion, and after it has been returned to the collecting bin serious explosions resulting in great damage are likely to occur. In the second of the above named systems it is practically impossible to maintain the mixture of air and fuel uniform, as the deficiency in the amount of fuel which has been created by some of it having been burnt in the furnaces must be supplied by means of an automatic mixing chamber, such automatic mixing chamber being regulated by means of a diaphragm or the like which never operates to such a degree of perfection as to insure a perfectly uniform mixture, and therefore causes a good deal of trouble and inconvenience to the operators of the furnaces, and moreover often results in faulty products.

One of the objects, therefore, of this invention is the provision of a system of feeding pulverized fuel to furnaces which is adapted to be operated with any number of furnaces and which will automatically supply a predetermined properly regulated mixture of a sufficient amount of fuel to each furnace, no matter whether one or all of them is in operation.

Another important object of the invention is the provision of an improved fuel feeding apparatus wherein the unconsumed portion of the mixture of fuel and air, which has become heated as it passes through the distributing pipe in proximity to the furnaces, is subjected to a separating process, the separated fuel and air being separately returned to the blower for recirculation with additional quantities of fuel and air. In this manner, the heat contained in the returned fuel and air is not lost, but the danger of spontaneous combustion in the storage bins is largely eliminated.

A further important object of the invention is the provision of an apparatus included in a feeding device for pulverized fuel, wherein the air which is mixed with the fuel to carry the same as a burning mixture through the distributing pipe is separated by automatic means from those portions of the mixture which have not been used and completely cleared and cleansed of the fuel before being used again in the blower of the apparatus.

Still another important object of the invention is the provision of a feeding device wherein any fuel which has not been used in its original trip through the distributing main is separated from the air mixed therewith and automatically returned to the original feed device to be again sent through the distributing main and wherein any deficiency in the amount of such fuel is automatically supplied in a regulated amount from the original fuel bins.

Other and further important objects of the invention will be apparent from the disclosures in the specification and the accompanying drawings.

The invention (in a preferred form) is illustrated in the drawings and more fully described in the accompanying specification.

On the drawings:

Figure 1 represents a system of furnaces adapted to be supplied with fuel by the improved system of this invention, and shows the feed apparatus connected therewith.

Figure 2 is a cross sectional view of the screw conveyor and its double intake openings used in connection with the automatic feed of this device.

Figure 3 is an enlarged detail view of the bin, separator and blower of the apparatus showing the connections therebetween.

Figure 4 is a detail view showing the construction of the automatically controlled mixing valve.

Figure 5 is an enlarged cross sectional detail view of the automatic mixing valve attached to the blower fan of this invention.

As shown on the drawings:

The reference numerals 10 indicate a series of furnaces adapted to be supplied with a mixture of air and pulverized fuel by the improved device of this invention. A main feed pipe 12 is maintained in position above the furnaces, having branches 14 opening therefrom. The feed pipe 12 communicates with means for mixing the fuel with air, preferably, a blower, fan, or air pump 16 which, as hereinafter described, is so constructed and operated as to deliver a proper mixture of air and fuel into the feed pipe 12. The portion of the fuel mixture which is not taken from the feed pipe 12 by the branch pipes 14 which lead to the furnaces 10 is returned by means of the return pipe 18 to a separator 20, which is preferably in the form of an ordinary cyclone separator, where the fuel is separated from its containing air on account of the rapid expansion in the separator which allows the fuel to settle out of suspension therefrom, and the purified but still warm air is conveyed through a pipe 22 back to an intake opening in the blower fan. The separator 20 may be provided with baffle plates, screens, or any other suitable apparatus adapted to separate the pulverized coal from the air. However, the expansion of the air as it enters into the sparator 20 from the pipe 18 is usually sufficient to allow the coal to settle out of suspension therefrom, which then drops through a pipe 24 and is immediately brought into contact with and fed forward by the screw 26 in the conveyor pipe 28, which also has leading thereinto a pipe 30 from the main fuel bin 32.

A feed pipe 34 leads from the end of the conveyor pipe 28 and discharges into the blower 16, which pumps the fuel, together with the air from pipe 22, and a regulated quantity of auxilary air, into the main feed pipe 12. The amount of auxiliary air entering the blower is regulated by a slide or shutter 36, as shown in Figure 4, and which is mounted so as to be rotatably adjusted to regulate the amount of air which enters the blower in addition to the heated air which always enters the blower through the pipe 22. A link 38 is pivotally connected to the shutter 36 by means of which its position may be regulated. The other end of this link 38 is pivotally connected to a handle 40 mounted on a rheostat switch board 42, which controls the speed of the blower fan motor 42$^a$. The rheostat switch is so connected to the shutter 36 by means of the link 38 that when the motor 42$^a$ is operating at full speed a maximum amount of auxiliary air is delivered thereto, and as the speed of the motor is gradually slowed down the amount of this air is likewise gradually diminished at a similar rate. It is of course apparent that other well known arrangements for obtained speed variations may be employed and the controls therefor interconnected with the shutter 36.

A motor 44 is provided by means of which the screw conveyor is continually driven, and a pulley 46 is mounted on the shaft of the blower 16 and adapted to be driven by a belt from a motor 42ª controlled by means of wires 48 leading from the switchboard 42 of the rheostat. Wires 49 lead from the switchboard 42 to the conveyor motor 44.

The operation is as follows:

A suitable quantity of pulverized coal having been placed in the bin 32, the motor 44 for the screw conveyor and the motor 42ª for the blower 16 are started, whereupon a quantity of fuel mixed with a regulated amount of air is delivered to the distributing pipe 12, from which the required amounts are taken by the furnaces 10 through the branch pipes 14. If all the furnaces 10 are not in operation, any excess fuel will be returned by means of the pipe 18 to the separator 20, where the fuel (pulverized coal or any other fuel) will be separated or precipitated out from suspension in the air on account of the expansion of the air in the separator. This air, having been heated in its passage through the pipes 12 and 18, is especially adapted to be used in forming a fuel mixture and this is accomplished by conveying the heated air, cleansed from the coal, by means of the pipe 22 down to the blower 16.

It will be seen that as the mixture of air and fuel coming from the return pipe 18 is not delivered directly to the main bin 32, any spontaneous combustion of the same which might occur would not result in such damage as would ordinarily follow if the combustion or explosion happened in the main bin 32. The coal or other fuel which is separated from the mixture in the separator 20 is conveyed by means of the pipe 24 to the further end of the screw conveyor 26, from whence it is delivered through the pipe 34 to the blower. It will be evident that as long as a sufficient quantity of fuel is returned to the conveyor by means of the pipe 24 the screw 26 will be kept filled and no additional fuel will be allowed to enter the pipe 28 as the screw conveyor 26 when passing the opening of the pipe 30 will be already filled with fuel and no more will be allowed to enter the threads of same. However, if one or more of the furnaces 10 are in operation, the quantity of fuel delivered back to the conveyor through the pipe 24 will be proportionately diminished, and an additional quantity sufficient to fill up the screw conveyor 26 to its maximum capacity will be delivered thereto through the pipe 30 which leads from the main bin 32. In this manner a uniform flow of pulverized fuel is positively maintained through the blower at all times, depending upon the speed of the motor 44, which of course is directly under the control of the operator.

The speed of the blower fan motor 42ª is controlled simultaneously with that of the motor 44 by means of the rheostat switchboard 42. The revoluble shutter 36 is operated by means of its connection with the rheostat switch-arm 40 and thereby automatically controls the admission of auxiliary cool air to the fan in accordance with the speed of the feed motor 44 and fan motor 42ª.

It will be seen that by means of this invention a fuel feed for furnaces, kilns or the like is provided which is always uniform and is absolutely under the control of the operator at all times. Furthermore, the likelihood of severe damage resulting from spontaneous combustion is reduced to a minimum, since the surplus of heated fuel is not returned to the main fuel bin and therefore comes into contact with the main supply of fuel only after the heated fuel has been precipitated out of suspension and delivered to the conveyor. It will also be seen that the amount of fuel delivered to the blower is uniform at all times and there is no waste of either heat or fuel resulting from the separation of the air from the coal in any unused mixture returned by means of the pipe line 18 on account of not having been burned by the furnaces. In this way a uniform feed of fuel and a perfectly uniform mixture is always maintained.

Further, this system possesses great advantages over those in which any unburned fuel mixture is returned directly to the blower, as in these last named systems, it is practically impossible to maintain a uniformly regulated mixture of air and fuel, as the original unused fuel, being returned directly to the blower, must be mixed therein with a new blend of fresh pulverized coal and air, which, obviously, cannot be continuously manually controlled and any automatic means for controlling the flow and proportions of such fresh mixture, must necessarily be delicate and complicated, and therefore very liable to get out of order and generally unsatisfactory.

I am aware that numerous details of construction and operation may be varied through a wide range, without departing from the principles of this invention, and I therefore do not purpose limiting the patent granted otherwise than necessitated by the prior art.

I claim as my invention:

1. A fuel supply system comprising a source of fuel supply, means for mixing fuel with air, means for introducing fuel from said source to said mixing means, a main supply line adapted to receive the resultant mixture, a separator distinct from said source of fuel supply, means for returning the unused mixture from said supply line to said separator, and means for delivering the separated fuel to said introducing means separately from the delivery of fuel from said source of fuel supply.

2. In a furnace feeding system, a bin for pulverized fuel, a blower, means for introducing fuel from said bin into the current of air created by said blower, a main supply line into which the resulting mixture is delivered, connections from said main supply line to the furnace, a return connection for unused mixture, means for separating the fuel in said returned mixture from the air therein, means for leading the separated air to said blower, and means for delivering the separated fuel to said introducing means separately from the delivery of fuel from said bin.

3. In a furnace feeding system, a source of supply of fuel, a blower, a conveyor adapted to deliver fuel from said source into the current of air created by said blower, a supply line for delivering the resulting mixture to the furnace and for returning the unused portion thereof, means for separating the fuel from the air of the returned mixture, and means for delivering the said separated fuel to said conveyor at a point to the rear of the communication of said conveyor with said source of fuel supply, whereby fuel from said source will be introduced only when the amount of separated fuel is insufficient to supply a full charge to said conveyor.

4. In a furnace feeding system, a source of supply of fuel, a blower, a conveyor adapted to deliver fuel from said source into the current of air created by said blower, a supply line for delivering the resulting mixture to the furnace and for returning the unused portion thereof, means for separating the fuel from the air of the returned mixture, means for feeding the separated air to said blower, and means for delivering the said separated fuel to said conveyor at a point to the rear of the communication of said conveyor with said source of fuel supply, whereby fuel from said source will be introduced only when the amount of separated fuel is insufficient to supply a full charge to said conveyor.

5. In a fuel feed system, a source of fuel supply, a separator, a supply line for delivering mixed fuel and air to a furnace and returning the unused fuel to the separator, means for mixing fuel and air and delivering same to the supply line, means for returning the separated air from the separator to the mixing means, other means for returning the separated fuel from the separator to the mixing means, and means for adding to the separated fuel sufficient fuel from the source of supply to repace that delivered to the furnace.

6. In a fuel feed system, a source of fuel supply, a separator, a supply line for delivering mixed fuel and air to a furnace, and returning the unused fuel to the separator, means for mixing fuel and air and delivering same to the supply line, means for delivering the separated fuel directly from the separator to the mixing means, and means for adding to this separated fuel, sufficient additional fuel from the source to provide a steady supply to the mixing means.

7. In a fuel feed system, a source of fuel supply, a separator, a supply line for delivering mixed fuel and air to a furnace, and returning the unused fuel to the separator, means for mixing fuel and air and delivering same to the supply line, means delivering the separated fuel from the separator to the mixing means, means for adding to this separated fuel sufficient additional fuel from the source to provide a steady supply to the mixing means, means for delivering the separated air from the separator to the mixing means, and means for supplying sufficient auxiliary air to compensate for that consumed by combustion.

In testimony whereof I have hereunto subscribed my name.

LARS H. BERGMAN.